United States Patent [19]

Ohuchi et al.

[11] 4,417,493
[45] Nov. 29, 1983

[54] METHOD FOR CUTTING OFF STEEL PLATE

[75] Inventors: Chiaki Ohuchi; Yoji Kohsaka; Hiroyoshi Suenaga, all of Yokohama, Japan

[73] Assignee: Nippon Kokan Kabushiki Kaisha, Tokyo, Japan

[21] Appl. No.: 251,729

[22] Filed: Apr. 7, 1981

[30] Foreign Application Priority Data

Apr. 28, 1980 [JP] Japan ................................ 55-56983

[51] Int. Cl.³ .............................................. B26D 7/10
[52] U.S. Cl. .......................................... 83/15; 83/51; 83/170; 83/617; 83/623
[58] Field of Search ............... 83/15, 16, 170, 617, 83/623, 51; 72/203

[56] References Cited

U.S. PATENT DOCUMENTS 3,492,853 2/1970 Gross .................................... 72/203
3,596,550 8/1971 Tomimaga ....................... 83/617 X
3,707,896 1/1973 Kononenko ....................... 83/51 X

FOREIGN PATENT DOCUMENTS 1407232 9/1975 United Kingdom ................. 83/170

Primary Examiner—James M. Meister
Attorney, Agent, or Firm—Frishauf, Holtz, Goodman and Woodward

[57] ABSTRACT

A method for cutting off a steel plate, wherein the steel plate is heated to a temperature within the range of from 950° to 1,400° C. at the time of cutting off the steel plate; the heated steel plate is placed on a roller table extending horizontally and positioned at a desired position so that a side edge of the heated steel plate is in contact with the cutting edge of at least one cutting knife on the roller table. The cutting edge angle of the cutting knife is within the range of from 10° to 45°. The cutting knife is then moved horizontally relative to the heated steel plate, in the width direction or the length direction of the steel plate, at a cutting speed of from 10 to 1000 cm/minute, thereby cutting off the steel plate by the cutting knife in the horizontal direction.

5 Claims, 5 Drawing Figures

METHOD FOR CUTTING OFF STEEL PLATE

REFERENCE TO PATENTS, APPLICATIONS AND PUBLICATIONS PERTINENT TO THE INVENTION

Japanese Patent Publication No. 42,732/78 dated Nov. 14, 1978.

FIELD OF THE INVENTION

The present invention relates to a method for cutting off a steel plate, capable of giving cut pieces having a desired size, at a high yield and at a high cutting speed, and under a low cutting force.

BACKGROUND OF THE INVENTION

In order to obtain a hot-rolled steel plate having a desired size, i.e., desired thickness, width and length through hot rolling, it is necessary to provide a material for hot rolling having prescribed thickness, width and length. For the purpose of obtaining a material for hot rolling having prescribed width and length, the following methods are known:

(1) A method for cutting off a continuously cast strand, disclosed in Japanese Patent Publication No. 42,732/78 dated Nov. 14, 1978, which comprises:
  (i) reducing a cast strand in cross-section from above and below by a pair of rolls having at the middle a V-shaped cross-section annular projection during continuous casting immediately after passing through the withdrawal rolls or the straightening rolls in a continuous casting installation, to form a V-shaped cross-section groove on each of the top and bottom surfaces of the cast strand along the longitudinal direction of the cast strand;
  (ii) gas-cutting the V-shaped groove portion of the cast strand in the longitudinal direction thereof by a "stationary" gas cutting means; and,
  (iii) gas-cutting each of the two resultant cut pieces into prescribed lengths;

(hereinafter referred to as the "prior art (1)").

In the prior art (1), it is certainly possible to cut a cast strand in the longitudinal and width directions thereof. In the prior art (1), however, since the cast strand should be gas-cut, the yield becomes lower and it is necessary to remove dross depositing onto the cut surface. Also in the prior art (1), the use of a pair of rolls for forming a V-shaped groove on a cast strand limits the cut width of the cast strand.

(2) A method for gas-cutting a steel plate (hereinafter referred to as the "prior art (2)")

In the prior art (2), it is possible to obtain cut pieces having desired width and length. In the prior art (2), however, the yield is low, and it is necessary to remove dross depositing onto the cut surface.

(3) A method for shearing a steel plate (hereinafter referred to as the "prior art (3)")

In the prior art (3), it is possible to obtain sheared pieces having desired width and length. In the prior art (3), however, the plate thickness capable of being sheared is limited to 40 mm at the maximum, and it is difficult to shear a long steel plate in the longitudinal direction.

SUMMARY OF THE INVENTION

An object of the present invention is therefore to provide a method for cutting off a steel plate, capable of giving cut pieces having desired width and length.

Another object to the present invention is to provide a method for cutting off a steel plate, capable of giving cut pieces at a high yield.

A further object of the present invention is to provide a method for cutting off a steel plate, capable of giving cut pieces having smooth cut surfaces.

A further object of the present invention is to provide a method for cutting off a steel plate, which permits cutting off the steel plate at a high cutting speed.

A further object of the present invention is to provide a method for cutting off a steel plate, which permits cutting off the steel plate while inhibiting deformation to the extent that hot rolling is not impaired.

A further object of the present invention is to provide a method for cutting off a steel plate, which permits cutting off a steel plate, in a hot rolling installation, at a cutting speed equivalent to the hot rolling speed.

A further object of the present invention is to provide a method for cutting off a steel plate, which permits cutting off a slab obtained by continuous casting.

In accordance with one of the features of the present invention, there is provided a method for cutting off a steel plate, which comprises:
  heating a steel plate to a temperature within the range of from 950° to 1,400° C. at the time of cutting off; and
  placing said heated steel plate on a roller table extending horizontally;
  characterized by:
  positioning said heated steel plate at a desired position so that a side edge of said heated steel plate is in contact with the cutting edge of at least one cutting knife on said roller table, the cutting edge angle of said cutting knife being within the range of from 10° to 45°; and,
  moving said cutting knife horizontally relative to said heated steel plate at a cutting speed of from 10 to 1000 cm/minute, thereby cutting off said steel plate in the horizontal direction from the side edge thereof by said cutting knife.

DETAILED DESCRIPTION OF PREFERRED EMBODIMENTS

Figure 1:
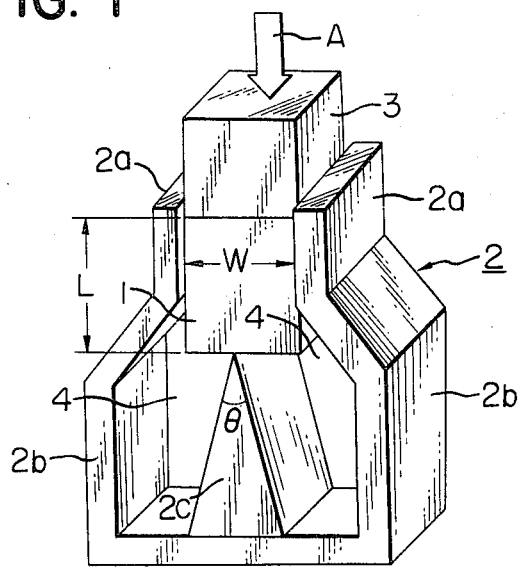
FIG. 1 is a schematic perspective view illustrating an experimental cutting apparatus of a heated steel plate.

From the above-mentioned point of view, studies were conducted to find a method for cutting off a steel plate, capable of giving cut pieces having desired width and length and smooth cut surfaces, at a high yield and permitting achievement of a high cutting speed, and as a result, the following findings were obtained:

(I) An experimental cutting apparatus was prepared for a heated steel plate, as shown in the schematic perspective view of FIG. 1. In FIG. 1, 1 is a steel plate having a size comprising a W (width): 60 mm, an L (length): 100 mm, and a thickness of 20 mm and having a chemical composition as described later; and, 2 is a steel plate supporting means made of a refractory. The steel plate supporting means 2 cmprises a pair of parallel supports 2a for supporting the both sides of the steel plate 1, a pair of support plates 2b for supporting the pair of supports 2a, and a V-shaped knife 2c, having an edge angle "θ" which is 30°, arranged beneath the pair of supports 2a. The steel plate 1 is vertically slidably supported between the pair of supports 2a. A block 3 having a horizontal cross-section substantially identical with the horizontal cross-section of the steel plate 1 is placed on the upper surface of the steel plate 1. The pair of supports 2a, the pair of support plates 2b, the knife 2c and the block 3 are made of a refractory principally comprising a high density silicon carbide. The knife 2c is provided with a pair of spaces 4, on the both sides thereof, for causing each of the two cut pieces of the steel plate 1 to drop down. A press (not shown) for pressing down, through the block 3, the steel plate 1 supported between the pair of supports 2a is arranged above the pair of supports 2a (the pressing direction of the press is indicated by the arrow "A" in FIG. 1). The steel plate supporting apparatus having the above-mentioned construction and the steel plate 1 are set in a electric furnace (not shown).

A plurality of steel plates 1 were prepared from each of two kinds of steel having the following chemical compositions (a) and (b):

(a) a steel containing 0.15 wt.% carbon (C), 0.32 wt.% silicon (Si), 1.55 wt.% manganese (Mn), and 0.046 wt.% niobium (Nb); and, (b) a steel containing 0.14 wt.% C, 0.26 wt.% Si, and 1.24 wt.% Mn.

Each of the resultant plurality of steel plates 1 was heated, between a pair of supports 2a in an electric furnace (not shown), to any of the following plurality of temperatures, and then, each of the plurality of steel plates 1 thus heated, between the pair of supports 2a in the electric furnace (not shown), to one of the specified plurality of temperatures was pressed down, through a block 3, by a press (not shown) at a cutting speed of 1 cm/minute. As a result, each of the plurality of steel plates 1 was cut off by the knife 2c under a maximum cutting force as shown in the following tables:

(i) For the steel plates 1 made of the steel having the chemical composition of (a):

| Heating temperature (°C.) | Maximum cutting force (kg) |
|---|---|
| 1,380 | 420 |
| 1,250 | 680 |
| 1,100 | 1,420 |
| 950 | 2,700 |

(ii) For the steel plates 1 made of the steel having the chemical composition of (b):

| Heating temperature (°C.) | Maximum cutting force (kg) |
|---|---|
| 1,250 | 380 |
| 1,100 | 620 |
| 950 | 2,350 |

All the resultant two cut pieces of each of the steel plates 1 had smooth cut surfaces. This demonstrated that it was possible to cut off, by the knife 2c, the steel plates 1 made of the steel having the chemical composition shown in (a) and the steel plates 1 made of the steel having the chemical composition shown in (b), and that it was possible to obtain cut pieces having smooth cut surfaces. It was also found that the steel plates 1 having the chemical compositions shown in (a) and (b) could be cut off under a smaller maximum cutting force when such plates were heated to a higher temperature.

Figure 2:
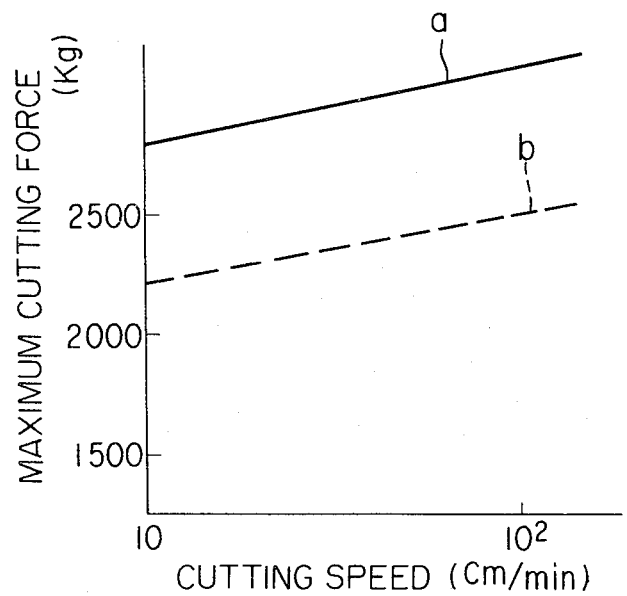
FIG. 2 is a diagram illustrating the relationship between the maximum cutting force applied by the cutting knife to a heated steel plate and the cutting speed, as obtained by the experimental cutting apparatus illustrated in FIG. 1.

Each of the plurality of steel plates 1 made of the steel having the chemical composition given in (a) was heated, between the pair of supports 2a in an electric furnace (not shown), to 1,100° C. or 1,200° C., then, each of the plurality of steel plates heated to a temperature of 1,100° C. or 1,200° C. was pressed down, through the block 3, by a press (not shown) and was cut off by a knife 2c at any of the plurality of cutting speeds. The relationship between the maximum cutting force required at the knife 2c for cutting each of the plurality of steel plates 1 and the cutting speed is illustrated in FIG. 2. In FIG. 2, the solid line "a" represents the steel plates 1 heated to 1,100° C., and the dotted line "b" indicates the steel plates 1 heated to 1,200° C. It was thus found, as shown in FIG. 2, that, for the steel plates 1 heated to 1,100° C. and 1,200° C., a higher cutting speed led to a larger maximum cutting force.

(II) A material for hot rolling having a prescribed size is heated, prior to hot rolling, to a temperature adapted to hot rolling in a reheating furnace. As described in the above item (I), it is possible to cut off the steel plate 1 by the knife 2c at a temperature adapted to hot rolling and at a cutting speed identical with the hot rolling speed. It is therefore possible to cut the steel plate by a knife at a point on the exit side of the reheating furnace and before the hot rolling installation, and/or, between prescribed rolling stands in the hot rolling installation.

The present invention was made on the basis of the findings described in the above items (I) and (II). More particularly, the method for cutting off a steel plate of the present invention comprising:

heating a steel plate to a temperature within the range of from 950° to 1,400° C. at the time of cutting off; and placing said heated steel plate on a roller table extending horizontally;

characterized by:

positioning said heated steel plate at a desired position so that a side edge of said heated steel plate is in contact with the cutting edge of at least one cutting knife on said roller table, the cutting edge angle of said cutting knife being within the range of from 10° to 45°; and, moving said cutting knife horizontally relative to said heated steel plate at a cutting speed of from 10 to 1,000 cm/minute, thereby cutting off said steel plate in the horizontal direction from the side edge thereof by said cutting knife.

In the present invention, the steel plate temperature at the time of cutting off, the edge angle of the cutting knife, and, the cutting speed of steel plate are limited as mentioned above for the following reasons:

1. Steel plate temperature at the time of cutting off

With a steel plate temperature of under 950° C., the maximum cutting force of the steel plate at the cutting knife becomes too large. As a result, the cutting knife tends to be easily broken and to have a seriously decreased service life. The steel plate temperature at the time of cutting off should therefore be at least 950° C. With a steel plate temperature of over 1,400° C., on the other hand, the maximum cutting force of the steel plate at the cutting knife becomes extremely small. However, it becomes difficult to obtain a knife excellent in heat resistance and reaction resistance. The steel plate temperature at the time of cutting off should therefore be up to 1,400° C.

2. Edge angle of cutting knife

With an edge angle of the cutting knife of under 10°, the cutting knife is insufficient in strength at the time of cutting off a steel plate, and tends to be easily broken. The edge angle should therefore be at least 10°. With an edge angle of over 45°, on the other hand, the increased maximum cutting force of the steel plate makes it difficult to cut off the plate, and the deformation of the steel plate after cutting leads to a shape not adapted to hot rolling. The edge angle should therefore be up to 45°.

3. Cutting speed of steel plate

With a cutting speed of steel plate of under 10 cm/minute, the maximum cutting force of the steel plate at the cutting knife is small, whereas it is difficult to keep the steel plate at a prescribed temperature until the completion of cutting of the steel plate. The cutting speed of steel plate should therefore be at least 10 cm/minute. With a cutting speed of steel plate of over 1000 cm/minute, on the other hand, the maximum cutting force of steel plate at the cutting knife increases to cause easy breakage of the cutting knife. The cutting speed of steel plate should therefore be up to 1000 cm/minute.

The following materials are most suitable for the materials of the cutting knife:

a. Refractory

For example, a refractory principally comprising a high density silicon carbide, and a refractory mainly comprising sintered alumina.

b. Ceramics

For example, a ceramics principally comprising an intermetallic compound of nickel and aluminum.

c. Hard metal principally comprising high melting point silicon carbodie:

For example, a hard metal principally comprising titanium carbide, and a hard metal principally comprising tungsten carbide.

Figure 3:
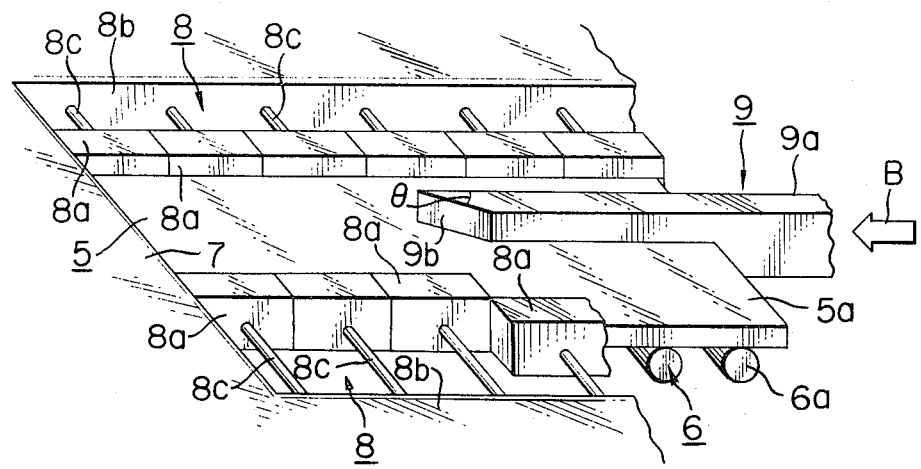
FIG. 3 is a schematic perspective view illustrating an embodiment of the apparatus for cutting off a steel plate for applying the method for cutting off a steel plate of the present invention.

FIG. 3 is a schematic perspective view illustrating an embodiment of the cutting apparatus for applying the method for cutting off a steel plate of the present invention. In FIG. 3, 5 is a steel plate to be cut off, heated in a reheating furnace (not shown); 6 is a roller table comprising a pair of roller groups arranged in parallel, the steel plate 5 being placed on the roller table 6; 6a are a plurality of rollers composing the roller groups, the middle of the roller table 6 in the width direction forming therefore a vacant space (not shown), and a fixed wall 7 being arranged at an end of the roller table 6; and, 8 are pair of positioning means arranged adjacent to the both ends of the roller table 6. Each of the pair of positioning means 8 comprises a plurality of holding members 8a arranged along the length of the roller table 6, a housing 8b arranged along the length of the roller table 6, and a plurality of hydraulic cylinders, in a number equal to that of the plurality of holding members 8a, built in the housing 8b. The body (not shown) of each of the hydraulic cylinders in a number equal to that of the plurality of holding members 8a is built in the housing 8b, and the rods 8c thereof are fitted with the plurality of holding members 8a. Each of the plurality of rods 8c is movable forward and backward in the width direction of the roller table 6 above the roller table 6. Each of the plurality of holding members 8a moves forward or backward, in response to the amount of movement of the rods 8c, in the width direction of the roller table 6, above the roller table 6.

In FIG. 3, 9 is a knife freely movable, by a first driving means (not shown), along the longitudinal direction of the roller table 6, through the vacant space (not shown) at the middle in the width direction of the roller table 6. The first driving means (not shown) is capable of being fixed. The knife 9 comprises a flat main body 9a in parallel with the longitudinal direction of the roller table 6 and a working surface 9b forming the edge at an end thereof. The edge angle "$\theta$" of the knife 9 is formed into an angle within the range of from 10° to 45°. When inoperative, the knife 9 lowers to beneath the roller table 6 with the use of a first lift means (not shown) provided on the first driving means (not shown), and when operative, it goes up so that the top end thereof projects at least above the upper end of the roller table 6. The knife 9 is fitted to a first press (not shown) provided on the first lift means (not shown). The knife 9 therefore advances toward the fixed wall 7, as shown by the arrow "B" in FIG. 3. The first driving means, the first lift means, and the first press are stationary in the width direction of the roller table 6. The knife 9 is therefore stationary in the width direction of the roller table 6.

When the knife 9 lowers, the steel plate 5 can move on the roller table 6 above the knife 9, and an end of the steel plate 5 can be brought into contact with the fixed wall 7. The steel plate 5 of which an end is in contact with the fixed wall 7 is pressed on the both ends thereof by the plurality of holding members 8a of the pair of positioning means 8, and it is possible to determine the position of the steel plate 5 in the width direction relative to the knife 9, in response to the amount of advance of the plurality of holding members 8a on each of the both sides of th roller table 6.

The steel plate 6 is cut off as follows by the above-mentioned construction:

first, heating the steel plate 5, in a reheating furnace (not shown), so as to achieve a temperature within the range of from 950° to 1,400° C. at the time of cutting off, then, placing the steel plate 5 on the roller table 6 with the knife 9 at its lowest position;

then, moving the steel plate 5 on the roller table 6 to bring an end thereof into contact with the fixed wall 7;

then, pressing the plurality of holding members 8a against the both sides of the steel plate 5 on the roller table 6 under a prescribed pressure, by causing each of the plurality of holding members 8a arranged on the both sides of the roller table 6 to advance by the actuation of the hydraulic cylinder built in the housing 8b, and positioning the steel plate 5 relative to the knife 9;

then, raising the V-shaped knife, and fixing the first driving means (not shown) and the first lift means (not shown); and, then, causing the knife 9 to advance toward the fixed wall 7 by the first press (not shown); the knife 9 cuts off the steel plate 5 as the knife 9 advances; one cut piece 5a of the steel plate 5 having a cut surface in contact with a working surface 9b of the knife 9 pushes back the plurality of holding members 8a in contact with the cut piece 5a, since the working surface 9b of the knife 9 forms a prescribed angle with the advancing direction of the knife 9 and the main body 9a of the knife 9 has a prescribed thickness; and thus, the steel plate 5 is cut off by the knife 9.

Figure 4:
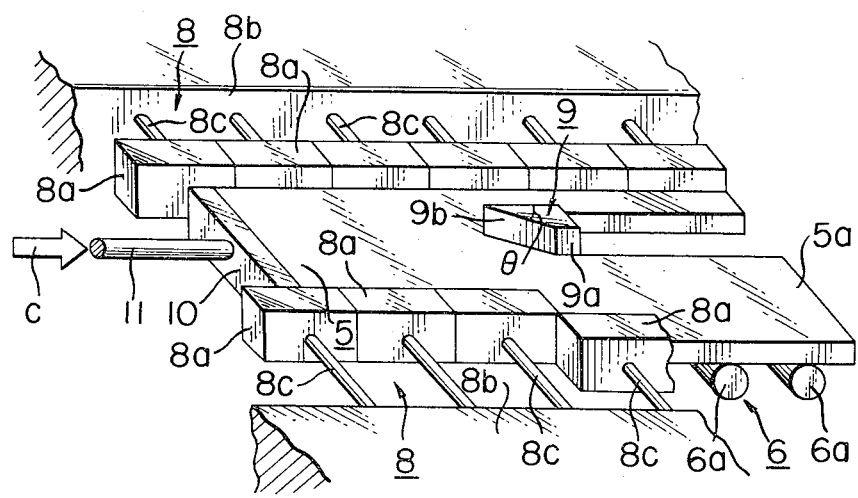
FIG. 4 is a schematic perspective view illustrating another embodiment of the apparatus for cutting off a steel plate for applying the method for cutting off a steel plate of the present invention; and, FIG. 5 is a schematic perspective view illustrating a further embodiment of the apparatus for cutting off a steel plate for applying the method for cutting off a steel plate of the present invention.

FIG. 4 is a schematic perspective view illustrating another embodiment of the cutting apparatus of steel plate for the application of the method for cutting off a steel plate of the present invention. As shown in FIG. 4, the knife 9 is movable along the longitudinal direction of the roller table 6 by a second driving means (not shown) in the vacant space (not shown) at the middle in the width direction of the roller table 6. The knife 9 rises, when operative, by a second lift means (not shown) provided on the second driving means (not shown) so as to project at least above the top end of the roller table 6, and lowers, when inoperative, to below the lower end of the roller table 6. The second driving means (not shown) and the second lift means (not shown) of the knife 9 are capable of being fixed. The knife 9 is therefore capable of being fixed, when operative, at the highest position thereof.

In FIG. 4, 10 is a pressing board movable in the longitudinal and width directions of the roller table 6 by a third driving means (not shown) above the roller table 6. The pressing board 10 lowers, when operative, to a position close to the top end of the roller table 6 so as to oppose to the knife 9 projecting above the top end of the roller table 6, and rises, when inoperative, until the distance between the pressing board 10 and the top end of the roller table 6 becomes sufficient to allow pass of the steel plate 5 placed on the roller table 6. The pressing board 10 is fitted to the rod 11 of a second press (not shown) provided on the third lift means (not shown). The rod 11 is movable forward and backward along the longitudinal direction of the roller table 6. The third driving means (not shown) and the third lift means (not shown) are capable of being fixed.

As shown in FIG. 4, it is possible to press under a prescribed pressure, the steel plate 5 placed on the roller table 6, by the plurality of holding members 8a of each of the pair of positioning means 8 arranged on the both sides of the roller table 6, and to determine the position in the width direction of the steel plate 5 relative to the V-shaped knife 9, in response to the amount of advance of the plurality of holding members 8a for each of the both sides of the roller table 6 relative to the steel plate 5. The positioning means 8 is provided on a fourth driving means (not shown) so as to be movable in the same direction as the pressing board in synchronization therewith.

The steel plate 5 is cut off as follows by the above-mentioned construction:

first, heating the steel plate 5 in a reheating furnace (not shown) so as to achieve a temperature within the range of from 950° to 1,400° C. at the time of cutting off;

then, placing the steel plate 5 on the roller table 6 with the knife 9 at the lowest position; moving the steel plate 5 on the roller table 6 to locate it between the pressing board at a position near the top end of the roller table 6 and the knife 9; causing the knife 9 to project above the top end of the roller table 6; pressing, under a prescribed pressure, each of the plurality of holding members 8a against the both sides of the steel plate 5 on the roller table 6 by causing the plurality of holding members 8a for each of the pair of positioning means 8 arranged on the both sides of the roller table 6 to advance; and determining the position in the width direction of the steel plate 5 relative to the knife 9;

then, causing the knife 9 to advance relative to the steel plate 5 by the second driving means (not shown) to bring it into contact with an end of the steel plate 5 to fix the second driving means (not shown); causing the pressing board 10 to advance relative to the steel plate 5 by the third driving means (not shown) to bring it into contact with the other end of the steel plate 5 to fix the third driving means (not shown); causing the pressing board to advance (in the direction as indicated by the arrow "C" in FIG. 4) by the second press (not shown); driving the pair of positioning means 8, by the fourth driving means (not shown), in the same direction at the same speed as the pressing board 10; whereby the stationary knife 9 cuts off the steel plate 5 moving on the roller table 6 along with the advance of the pressing board 10, and a cut piece 5a of the steel plate 5 having the cut surface in contact with one working surface 9b of the knife 9 pushes back the plurality of holding members 8a in contact with the cut piece 5a, since the working surface 9b of the knife 9 forms a prescribed angle with the moving direction of the pressing board and the main body 9a of the knife 9 has a prescribed thickness; thus, the steel plate 5 is cut off into two by the knife 9.

Figure 5:
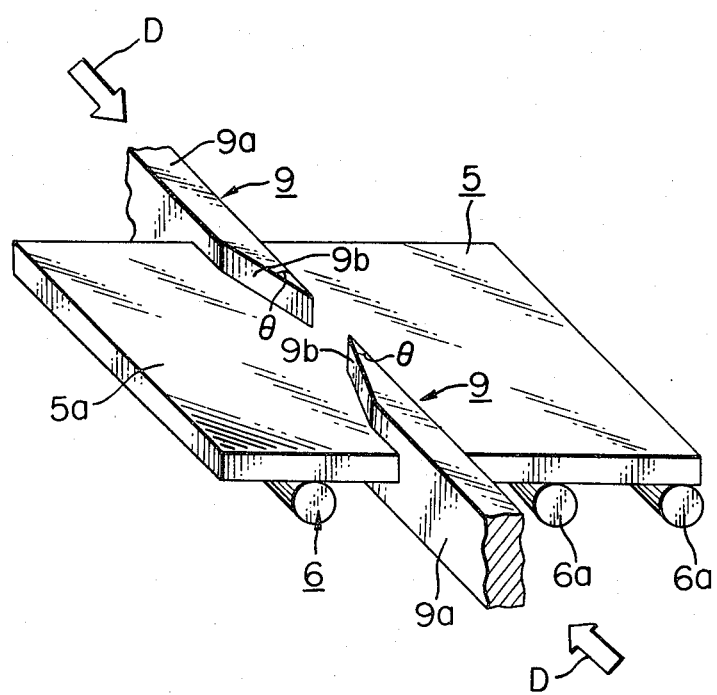

FIG. 5 is a schematic perspective view illustrating a further another embodiment of the cutting apparatus of steel plate for the application of the method for cutting off a steel plate of the present invention. As shown in FIG. 5, each of a pair of knives 9 is movable in a direction in which the knives become closer to and apart from each other along the width direction of the roller table 6, by a third press (not shown) in the space between the two rollers 6a adjacent with each other in the longitudinal direction of the roller table 6. It is therefore possible to cause smooth pass of the steel plate 5 on the roller table 6 by causing the pair of knives 9 to become most distant from each other. One working surface 9b in each of the pair of knives 9 is arranged in the upstream relative to the moving direction of the steel plate 5 on the roller table 6. When the pair of knives 9 become closest to each other, the edges thereof come in contact with each other.

In FIG. 5, each of a pair of positioning means (not shown) similar to the pair of positioning means 8 mentioned above with reference to FIGS. 3 and 4 is arranged on the both sides of the roller table 6, in the downstream of the knife 9 relative to the moving direction of the steel plate 5 on the roller table 6. In FIG. 5, it is possible to press the steel plate 5 placed on the roller table 6, under a prescribed pressure, by the plurality of holding members (not shown) for each of the pair of positioning means (not shown). Also in FIG. 5, a stopper (not shown) which lowers, when operative, to be closer to the top end of the roller table 6 at the prescribed position in the longitudinal direction of the roller table 6, to prevent movement of the steel plate 5 on the roller table 6, and rises, when inoperative, not to impair pass of the steel plate 5 on the roller table 6, is provided above the roller table 6. Therefore, the position in the longitudinal direction of the steel plate 5 on the roller table 6, having an end in contact with the stopper (not shown) is determined relative to the knife 9, by determining the position of the stopper (not shown) in the longitudinal direction of the roller table 6.

The steel plate 5 is cut off as follows by the above-mentioned construction:

placing the steel plate 5, heated by a reheating furnace (not shown) so as to achieve a temperature within the range of from 950° to 1,400° C. at the time of cutting off, on the roller table 6 with the knives 9 being most distant from each other; causing the steel plate 5 to move on the roller table 6 toward the stopper (not shown) at its lowest position near the top end of the roller table 6 at a prescribed point in the downstream of the knives 9, to bring an end of the steel plate 5 into contact with the stopper; and, pressing each of the plurality of holding members (not shown) against the both sides of the steel plate 5 on the roller table 6, by causing each of the plurality of holding members of the pair of positioning means (not shown) arranged on the both sides of the roller table 6 to advance; thereby determining the longitudinal position of the steel plate 5 relative to the pair of knives 9;

then, causing, by the third press (not shown) each of the pair of knives 9 to advance relative to the steel plate 5 (the advancing direction indicated by the arrow "D" in FIG. 5), whereby, one working surface 9b for each of the pair of knives 9 cuts off the steel plate 5 in the width direction along with the advance of each of the pair of knives 9, and thus, the steel plate 5 is cut off by the pair of knives 9. As shown in FIG. 5, the steel plate 5 is cut off in the width direction thereof by bringing the pair of knives 9 closer to each other, whereas it is also possible to cut off the steel plate 5 in the width direction by using one of the knives 9 and causing it to move in the width direction of the steel plate 5.

Now, the present invention is describe with reference to examples.

EXAMPLE 1

A cutting apparatus having the construction described above with reference to FIG. 3 was employed. It was made of a hard metal having a chemical composition comprising 85 1 wt.% tungsten carbide, 4 wt.% titanium carbide, 1 wt.% tantalum carbide and 10 wt.% cobalt, and was provided with a knife having an edge angle of 30°. There was provided a steel plate 5 having a size comprising a width of 1,600 mm, a length of 4,000 mm and a thickness of 250 mm.

The steel plate 5 having the above-mentioned size was heated to 1,200° C. by a reheating furnace (not shown). Then, the steel plate 5 heated to 1,200° C. was removed from the reheating furnace (not shown), and immediately placed on the roller table 6 with the knife 9 at its lowest position. On the roller table 6, the steel plate 5 was immediately moved to bring an end thereof into contact with the fixed wall 7. Then immediately, the plurality of holding members 8a for each of the pair of positioning means 8 were pressed, under a prescribed pressure, against the both sides of the steel plate 5 while adjusting the amount of projection of the holding members 8a from the housing 8b; the position of the steel plate 5 was determined relative to the knife 9 so that the knife 9 equally divided the steel plate 5 longitudinally into two, and the steel plate 5 was fixed onto the roller table 6. Then, the knife 9 was raised to a position allowing cutoff of the steel plate 5, and was caused to advance at a cutting speed of 100 cm/minute toward the fixed wall 7. As a result, the steel plate 5 was equally divided by the knife 9 into two longitudinally under 30 tons of a maximum cutting force at the knife 9. At the completion of cutting off, the steel plate 5 had a temperature of 1,180° C. The two cut pieces obtained by the cutoff of the steel plate 5 had smooth cut surfaces. The cut piece 5a of the steel plate 5, of which the cut surface was in contact with one working surface 9b of the knife 9 during cutoff of the steel plate 5 pushed back the holding members 8a coming into contact therewith. As a result, the two cut pieces obtained after cutoff of the steel plate 5 had a maximum amount of thickness deformation of 38 mm, and the two cut pieces were rolled with no trouble in the subsequent hot rolling.

EXAMPLE 2

A cutting apparatus having the construction described above with reference to FIG. 4 was used. The same knife 9 in chemical composition and the same steel plate as in Example 1 were provided.

The steel plate 5 having the above-mentioned size was heated by a reheating furnace (not shown) to 1,200° C. Then, the steel plate 5 heated to 1,200° C. was removed from the reheating furnace (not shown), immediately placed on the roller table 6 with the knife 9 at its lowest position, and immediately caused to move on the roller table 6 to locate it between the knife 9 and the pressing board 10. Then immediately, the plurality of holding members 8a for each of the pair of positioning means 8 were pushed, under a prescribed pressure, against the both sides of the steel plate 5 while adjusting the amount of projection of the holding members 8a from the housing 8b, and the position of the steel plate 5 was determined relative to the knife 9 so that the knife 9 equally divided the steel plate 5 longitudinally into two. Then, the knife 9 was raised to a position allowing cutoff of the steel plate 5, was caused to move toward the pressing board 10 until it came into contact with an end of the steel plate 5, and was fixed at this contact position. Then, the pressing board 10 and the pair of positioning means 8 were caused to advance at a cutting speed of 100 cm/minute toward the knife 9. As a result, the steel plate 5 was equally divided by the knife 9 into two longitudinally under 30 tons of a maximum cutting force at the knife 9. At the completion of cutting off, the steel plate 5 had a temperature of 1,180° C. The two cut pieces obtained by the cutoff of the steel plate 5 had smooth cut surfaces. As in Example 1, the cut pieces 5a of the steel plate 5, of which the cut surface was in contact with one working surface 9b of the knife 9 during cutoff of the steel plate 5 pushed back the holding members 8a coming into contact therewith. As a result, the two cut pieces obtained after cutoff of the steel plate 5 had a maximum amount of thickness deformation of 38 mm, and the two cut pieces were rolled with no trouble in the subsequent hot rolling.

EXAMPLE 3

A cutting apparatus having the construction described above with reference to FIG. 5 was employed. Two knives 9 identical in chemical composition with that in Example 1 and the same steel plate 5 as in Example 1 were provided.

The steel plate 5 having the above-mentioned size was heated by a reheating furnace (not shown) to 1,200° C. Then, the steel plate 5 heated to 1,200° C. was removed from the reheating furnace (not shown), immediately placed on the roller table 6 with the knives 9 at positions most distant from each other, and immediately caused to move on the roller table 6 to bring an end of the steel plate 5 into contact with the stopper (not shown) at its lowered position near the top end of the roller table 6. Then immediately, the plurality of holding members (not shown) for each of the pair of positioning means (not shown) were pushed, under a prescribed pressure, against the both sides of the steel plate 5, and thereby the position of the steel plate 5 was determined relative to the knives 9. Then each of the pair of knives 9 was caused to advance at a cutting speed of 100 cm/minute toward the steel plate 5. As a result, the steel plate 5 was cut off by each of the pair of knives 9 in the width direction of the steel plate 5 under 25 tons of a maximum cutting force at the V-shaped knife. At the completion of cutting off, the steel plate 5 had a temperature of 1,190° C. The two cut pieces obtained by the cutoff of the steel plate 5 had smooth cut surfaces. The two cut pieces obtained after cutoff of the steel plate 5 had a maximum amount of thickness deformation of 38 mm, and the two cut pieces were rolled with no trouble in the subsequent hot rolling.

According to the method of the present invention, as described above in detail, it is possible to cut off a steel plate so as to obtain cut pieces having desired width and length, at a high yield and at a high cutting speed, while inhibiting deformation, so as to give smooth cut surfaces of the cut pieces, and at a cutting speed equal to the hot rolling speed in the hot rolling installation, and also to cut off a continuously cast slab, thus providing industrially useful effects.

What is claimed is:

1. A method for cutting off a steel plate, comprising:
    heating a steel plate to a temperature within the range of from 950° to 1,400° C. at the time of cutting off the thus heated steel plate, said steel plate having side edges and opposing faces;
    placing said heated steel plate on a roller table extending horizontally with said opposing faces extending horizontally; and then
    cutting off said heated steel plate by means of a cutting knife having a cutting edge, the cutting edge angle of said cutting knife being within the range of from 10° to 45°;
    said cutting off step comprising moving one of said cutting knife and heated steel plate relative to the other of said cutting knife and heated steel plate, in the horizontal direction and substantially perpendicular to one of said side edges of said heated steel plate, such that said cutting edge cuts through said steel plate at a cutting speed of from 10 to 1,000 cm/minute;
    thereby cutting off said heated steel plate in the horizontal direction by means of said at least one cutting knife.

2. The method as claimed in claim 1, wherein:
    said heated plate is stationarily fixed on said roller table during said cutting step; and
    said moving step comprises moving said cutting knife horizontally in the longitudinal direction of said heated steel plate, thereby longitudinally cutting off said heated steel plate in said horizontal direction.

3. The method as claimed in claim 1, wherein:
    said cutting knife is stationarily fixed during said cutting step; and
    said moving step comprises moving said heated steel plate horizontally in the longitudinal direction thereof relative to said fixed knife, thereby longitudinally cutting off said heated steel plate in said horizontal direction.

4. The method as claimed in claim 1, wherein:
    said heated steel plate is stationarily fixed on said roller table during said cutting step; and
    said moving step comprises moving said cutting knife horizontally in the width direction of said heated steel plate, thereby cutting off said heated steel plate in the width direction thereof and in said horizontal direction.

5. The method as claimed in claim 1, wherein:
    said heated steel plate is stationarily fixed on said roller table during said cutting step;
    a second cutting knife is provided for use in said cutting step; and
    said moving step comprises moving said cutting knives toward each other in a horizontal direction through said heated steel plate in the width direction of said heated steel plate from respective opposite sides of said heated steel plate, thereby horizontally cutting off said heated steel plate in the width direction thereof.

* * * * *